G. P. HEMSTREET.
METHOD OF MAKING ANCHOR BLOCKS.
APPLICATION FILED SEPT. 11, 1919.

1,327,710.

Patented Jan. 13, 1920.
4 SHEETS—SHEET 1.

Inventor:
George P. Hemstreet,
by Emery, Booth, Janney & Varney
Attys.

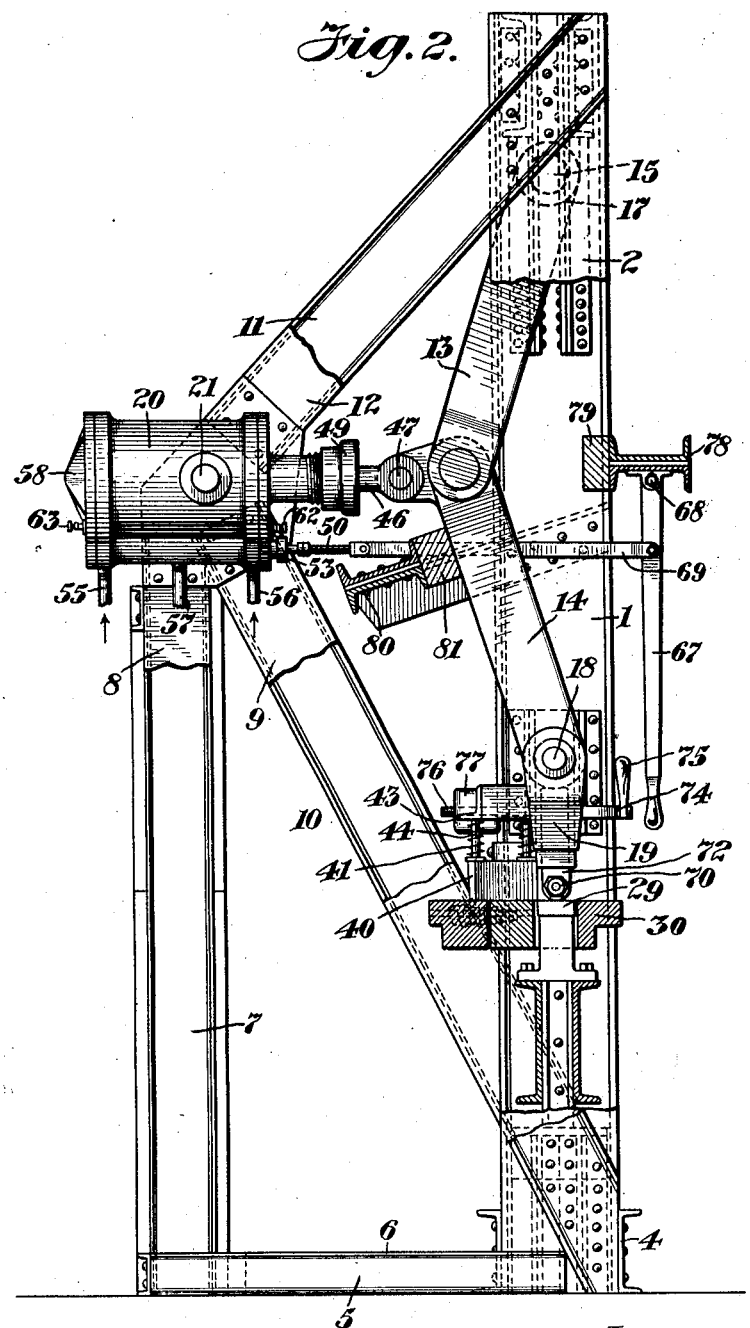

G. P. HEMSTREET.
METHOD OF MAKING ANCHOR BLOCKS.
APPLICATION FILED SEPT. 11, 1919.
1,327,710.
Patented Jan. 13, 1920.
4 SHEETS—SHEET 3.
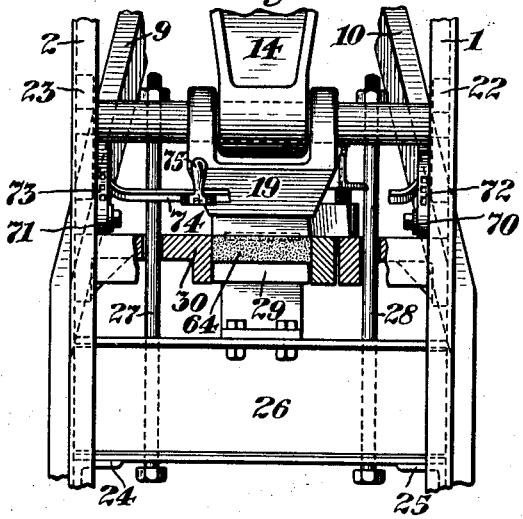
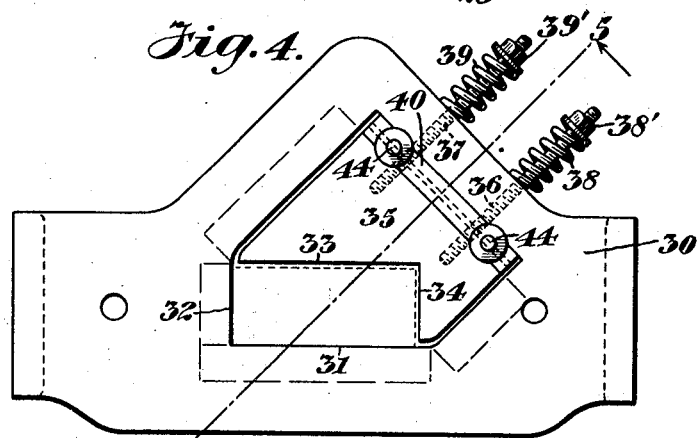
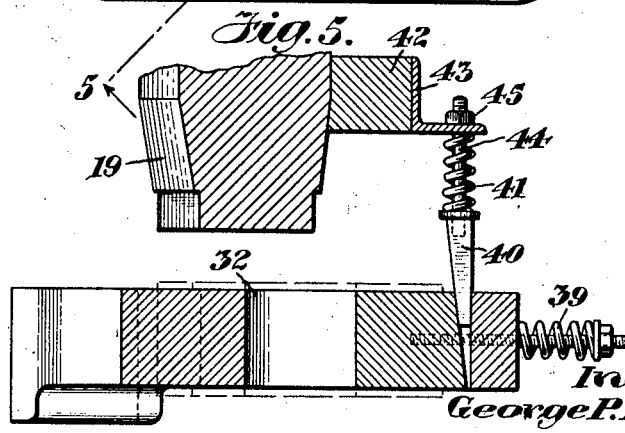
Inventor:
George P. Hemstreet,
by Emery, Booth, Janney & Varney
Attys.

G. P. HEMSTREET.
METHOD OF MAKING ANCHOR BLOCKS.
APPLICATION FILED SEPT. 11, 1919.
1,327,710.
Patented Jan. 13, 1920.
4 SHEETS—SHEET 4.
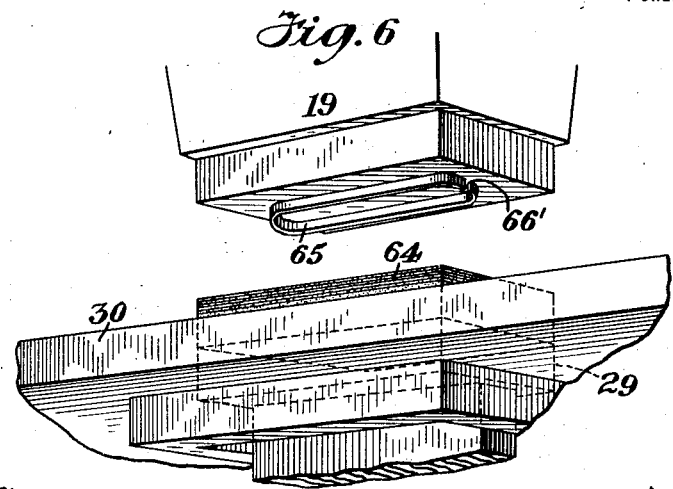
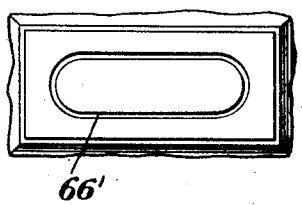
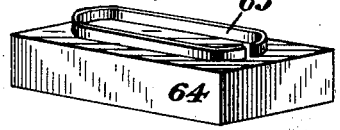
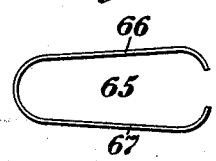
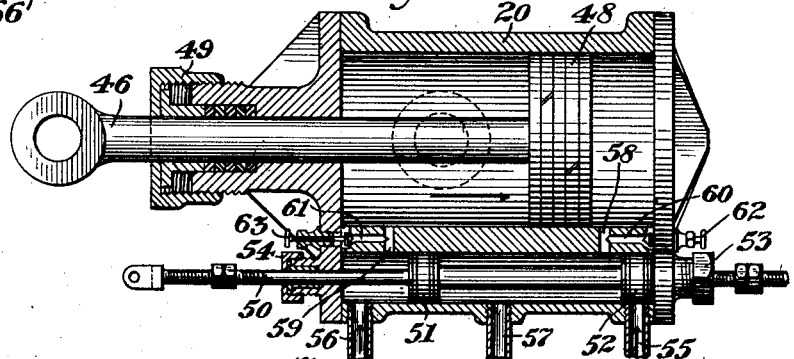
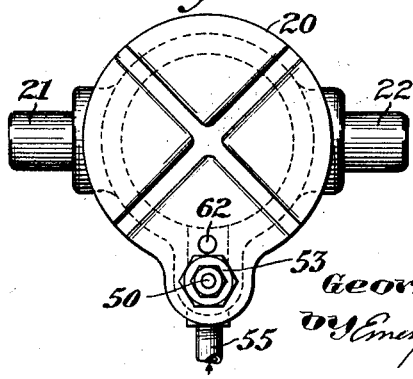
Inventor:
George P. Hemstreet,
by Emery Booth, Janney & Varney
Attys.

UNITED STATES PATENT OFFICE.

GEORGE P. HEMSTREET, OF HASTINGS-UPON-HUDSON, NEW YORK, ASSIGNOR TO THE INTERNATIONAL PAVEMENT COMPANY, OF HARTFORD, CONNECTICUT, A CORPORATION OF CONNECTICUT.

METHOD OF MAKING ANCHOR-BLOCKS.

1,327,710.   Specification of Letters Patent.   Patented Jan. 13, 1920.

Original application filed July 15, 1916, Serial No. 109,428. Divided and this application filed September 11, 1919. Serial No. 323,100.

*To all whom it may concern:*

Be it known that I, GEORGE P. HEMSTREET, a citizen of the United States, and a resident of Hastings-upon-Hudson, in the county of Westchester and State of New York, have invented an improvement in methods of Making Anchor-Blocks, of which the following description, in connection with the accompanying drawings, is a specification, like characters on the drawings representing like parts.

This invention relates to presses for compressing asphaltic or other blocks or tiles for paving and for other purposes, and more particularly to presses and methods adapted for use in the manufacture of so-called anchor paving blocks.

This application is a divisional of my copending application Serial No. 109,428, filed July 15, 1916, Pat. No. 1,319,075, October 21, 1919.

The accompanying drawings show one preferred illustrative embodiment of this invention, and therein—

Fig. 2 is a side elevation partly in section;

Fig. 3 is an enlarged front view of the pressure head and coöperating mold, also partly in section;

Fig. 4 is a plan view of the mold plate;

Fig. 5 is a section on the line 5—5 of Fig. 4; and

Figure 1:
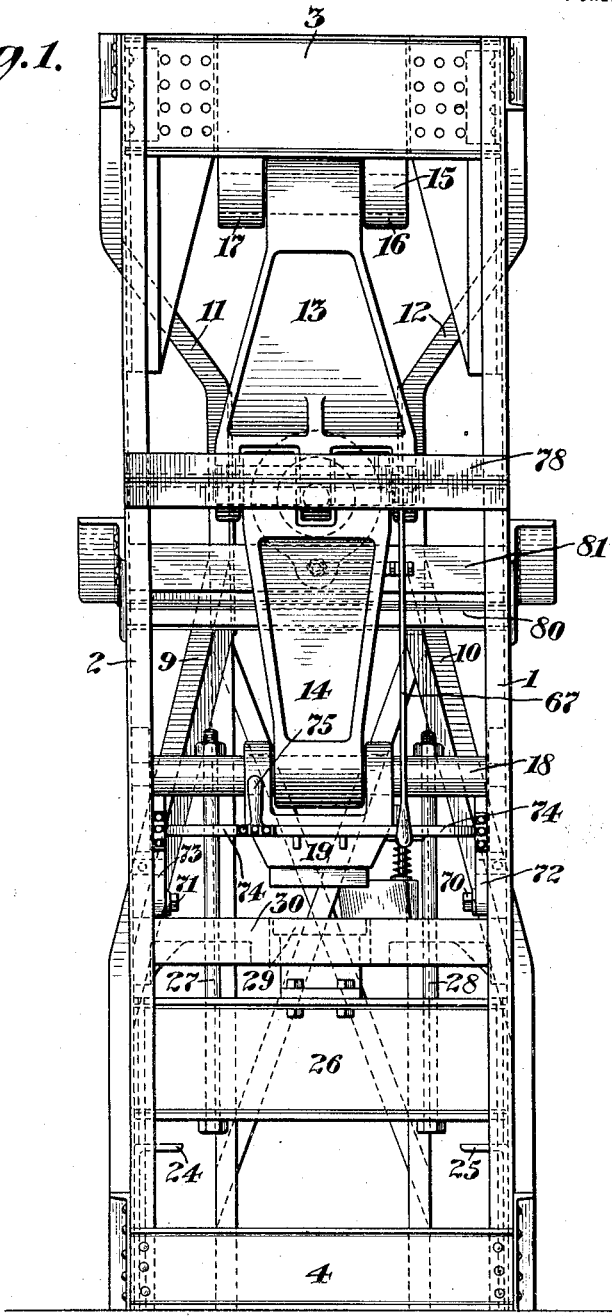
Figure 1 is a front elevation.

Figs. 6 to 11 inclusive are detail views later to be referred to.

The general construction of the press herein shown may be best understood by reference to Figs. 1 and 2. A rectangular frame is in this instance, built up from ordinary commercial structural steel and comprises two upright channel beams 1 and 2 connected at the top and bottom by cross members 3 and 4. Extending rearwardly from the bottom of the frame are a pair of channel irons 5 and 6 secured at their forward ends to the lower part of the rectangular frame and at their rear ends to upright members 7 and 8. Four diagonal braces 9, 10, 11 and 12 are secured to the upper and lower ends of the rectangular frame and extend rearwardly toward and are secured to the uprights 7 and 8.

The press is herein shown as a toggle press, the toggle being formed by upper and lower members 13 and 14, the upper toggle 13 being fulcrumed at 15 in bearings 16 and 17 which are fast to the upper cross member of the rectangular frame. A cross head 18 is carried by the lower toggle member and mounted upon this cross head is the pressure head 19 of the press.

Means actuating the toggle and thereby moving the pressure head vertically are herein shown as a steam cylinder 20 mounted upon trunnions 21 and 22 which are journaled in the frame substantially at the intersection of the diagonal braces 9—12 and the upright supports 7 and 8. The cross head 18 is slidable in vertical guideways 22 and 23. Depending from the cross head 18 are a pair of adjustable rods 27 and 28 carrying at their lower ends a transversely extending mold plunger support 26 upon which is mounted a mold plunger 29, which constitutes the bottom of the mold to be described. Fast to the upright side members 1 and 2 near the lower ends of the rectangular frame are a pair of brackets 24, 25 upon which the plunger support rests during the compressing of any material contained in the mold. The depending rods 27 and 28 are slidable in the plunger support 26 and are so adjusted that upon the descent of the pressure head the plunger 26 will rest upon the brackets 24, 25 prior to the application of pressure by the toggles. After the compressing is complete, and the pressure head is partially withdrawn from the mold the depending rods 27 and 28 will raise the plunger support 26 and thereby raise the mold plunger 29. With proper adjustments the mold plunger 29 may thus be brought to a level with the top of the mold plate 30 thereby ejecting the compressed article from the mold so that it may be readily removed from the press by the operator.

It is desirable in applying pressure to a formed or partly formed semi-plastic article, such as an asphaltic composition block, that the pressure be applied in such a manner that the shape of the article will not be distorted. For illustration reference may be made to the manufacture of asphalt composition paving blocks. These blocks comprise various ingredients with an asphaltic composition as a binder and are originally compressed and approximately sized by suitable apparatus. Oftentimes with certain blocks this first operation does not sufficiently compact the materials of which the block is made, and it is therefore desirable to repress the blocks.

In repressing these blocks it is preferable that the initial shape and size be retained as far as possible. If pressure be applied merely from the top and no means are provided for retaining the side walls of the block obviously the block will be distorted. If, however, even slight pressure be applied to the sides of the block or the sides of the mold be held firmly in contact with the sides of the block, the repressing operation may be successfully carried on. It is impractical to force a block into a mold due to the liability to break the edges thereby destroying the blocks and also due to the increased time required for such an operation.

Again by way of illustration reference may be made to the manufacture of so-called anchor paving blocks. An illustrative anchor block is shown in Fig. 9 of the drawings and therein an anchor member 65 (see Fig. 8) is shown as a strip of metal bent into a substantially oblong form and embedded into the material of the block which may be the ordinary asphaltic composition block composed of crushed stone, stone dust and an asphaltic composition binder. When the block is laid with others to form a pavement, the anchor member projects downwardly from the block and is engaged by the material of the road foundation. Preferably the anchor member is embedded in the paving block when the latter is slightly softened which may be just after the initial compressing before the block has thoroughly cooled and hardened, or after reheating in a steam bath or otherwise. If the block is not firmly held while the anchor member is being forced into the block the latter may easily be split or cracked. It is therefore desirable as in the case of repressing blocks that a certain degree of pressure be applied to the sides of the block or at least that the sides of the mold be held firmly against the sides of the block during the embedding of the anchor member.

Means are herein provided for securing these desired results; the same being herein shown and described as follows: A stationary mold plate 30 (see Fig. 4) is mounted between the rectangular frame members 1 and 2 and rigidly secured thereto. The mold is constituted by four side walls, 31, 32, 33 and 34. The mold walls 31 and 32 (see Fig. 4) are formed in the mold plate 30 while the mold walls 33 and 34 are formed in a block 35 which is mounted to slide diagonally in the mold plate 30 along a line substantially at an angle of 45 degrees to the walls 31 and 33 of the mold. Stud bolts 36 and 37 are screwed into the block 35, extend outwardly through the plate 30 and carry at their outer ends nuts 38' and 39' between which and the plate 30 are compression springs 38 and 39 tending to hold the mold block 35 in retracted position to open or enlarge the mold.

Suitable means for moving the mold block 35 may be provided, the same being herein shown as a vertically movable wedge 40 (see Fig. 5) adapted to be moved downwardly between the movable mold block 35 and the stationary mold plate 30 to move inwardly the side walls 33 and 34 of the mold. The wedge 40 is preferably actuated by the pressure head of the mold. Preferably also the wedge is actuated from the pressure head through a heavy compression spring 41. Fast to a laterally extending lug 42 upon the pressure head is an angle iron 43 and carried by the wedge 40 is a stud bolt 44 having a threaded stem extending upwardly through the angle iron between which and the wedge the spring is interposed. A nut 45 screwed upon the upper end of the threaded stem of the stud bolt determines the inactive position of the wedge. As the pressure head descends the wedge will be forced between the movable and fixed mold plates until the resistance to the downward movement of the wedge operates to overcome the power of the spring 41. Preferably the stud bolt and spring are duplicated as shown in Fig. 4.

The means herein provided for actuating the toggle press, namely the steam cylinder 20 and its coöperating parts, are best shown in Figs. 10 and 11. A piston rod 46 is pivotally attached to the lower toggle member 14 at 47, extends into the steam cylinder 20, and carries a piston 48 (see Fig. 10) provided with suitable piston rings. A suitable stuffing box 49 is provided for the piston rod 46. The steam cylinder is double acting, having steam ports adapted to admit steam to one side of the piston to cause the toggles to be moved into or toward alinement, and to the other side to cause the toggles to be withdrawn from alinement.

Means to control the operation of the press actuating means, include a balanced throttle valve of the cylindrical type mounted preferably in a valve chamber formed integral with the steam cylinder. The valve comprises a valve rod 50 which carries two pistons 51 and 52; suitable stuffing boxes 53 and 54 being provided for the valve rod 50. Steam is admitted to the valve chamber through two steam supply pipes 55 and 56 which may lead to a common source of steam supply, and is exhausted from the valve chamber through an exhaust pipe 57 opening from between the valve pistons. Leading to the interior of the steam cylinder are ports 58 and 59 while by-pass ports 60 and 61 lead from the main ports 58 and 59 respectively and open into the steam cylinder closely adjacent the end walls thereof; the latter ports being controlled respectively by valves 62 and 63. It will be noted that the ports 58 and 59 will be closed by piston 48 during its travel within the steam cylinder.

Means are shown to provide a positive stop for the movement of the toggles 13 and 14. The cross brace 78 carries a buffer 79 against which the toggles will be forced when in alinement, and the cross brace 80 carries a buffer 81 against which the lower toggle will rest when in retracted position.

Means may be provided to cushion the piston and its connected parts during the operation of the press, so that the machine may not be strained as the maximum power is applied or as the heavy toggles are withdrawn from alinement; the same being herein provided by the by-pass ports 60 and 61 and the valves 62 and 63. The piston 48 is here shown in mid position about to complete its backward stroke in drawing the toggles from alinement; the arrow indicating its direction of movement. The throttle valve in the position shown opens connection between the steam supply and the left-hand side of the piston while the port 58 is open to exhaust to allow steam to escape from the right hand side of the piston. As the piston continues its movement from the position shown the port 58 will be closed by the piston 48 before the piston has reached its full retracted position. In this event the only passage by which the entrapped steam may escape from the right hand side of the piston is through the by-pass port 60. If therefore by the adjustment of the valve 62 this by-pass port be made sufficiently small the entrapped steam will exert pressure upon the piston 48 opposed to the pressure of steam upon the other side of the piston, thus tending to retard the movement of the piston 48. The valve 62 may be so adjusted that the entrapped steam will escape slowly and thus eventually permit the high pressure steam to force the piston to the right as far as need be.

If now the throttle valve be moved to neutral position, both ports 58 and 59 will be closed and the piston 48 will remain in full retracted position until it is desired to operate it again.

When in the operation of the machine the throttle valve is moved to the left, the port 58 will be opened to the steam supply. Steam will not now be admitted to the steam cylinder through this port because it is closed on the inner side by the piston 48, but will be admitted only through by-pass port 60. Thus the piston will be moved slowly until port 58 is opened, when the full pressure of steam will be admitted. Upon movement of the piston to the left (see Fig. 10) the operation of the several parts will be reversed, and the piston 48 will cut off port 59 while the entrapped steam on the left hand side of the piston will operate to cushion the movement of the piston and its connected parts, while forcing the toggles into or toward alinement.

To hold the anchor member in correct position upon the under side of the pressure head so that it may be carried down with it, affixed to the block with accuracy and precision, and thereafter released from engagement with the pressure head, I have provided suitable means herein shown as a slot 66 in the under side of the pressure head, adapted to receive the anchor member. The anchor member is resilient and is sprung slightly before insertion in the slot which allows it to be retained securely in said slot and secured to and carried down by the pressure head and attached to or embedded in the paving block. In this particular instance the sides of the anchor member may be sprung together before insertion in the slot whereupon the sides of the anchor member will bear against the outer walls of the slot. The slot performs another function in that it gages the extent to which the anchor member will project from the finished block; the depth of the slot providing this gage.

The operation of the press (see Figs. 1 and 2) is controlled by two levers; one lever 67 being pivoted at 68 and connected to the shaft 50 of the throttle valve by the link 69 and the other lever 75 being connected to a safety device. The control levers are so situated that the operator of the press must use both hands to bring down the pressure head, thereby greatly minimizing the danger of injury in the operation of the press. Pivoted at 70 and 71 to the rectangular frame members 1 and 2 respectively just above the mold plate 30, are a pair of upstanding arms 72 and 73 connected by a cross member 74 upon which control lever 75 is mounted. The arms 72, 73 are held in normal position under the cross head to prevent its descent by suitable means herein shown as a lever arm 76 carrying a weight 77. It will be seen by reference to Figs. 1 and 2 that the control lever 75 must be pulled forward and held in forward position before the opening of the throttle valve will have any effect to move the cross head 18, therefore the operator must place his left hand upon control lever 75 and his right hand upon control lever 67. With both hands thus engaged there is slight possibility of injury from the descent of the pressure head.

The operation of the press will be described in connection with the manufacture of anchor blocks. This description will be sufficient to make the operation sufficiently clear when the press is used for other purposes; it being obvious that when it is desired to repress paving blocks a pressure head without the slot 66 will be substituted for the one shown.

As previously noted blocks which are to be made into anchor blocks are preferably supplied to the operator of the press in slightly softened condition which may be before they have thoroughly cooled and hardened after the first compressing. The anchor member 65 is first inserted in the under side of the pressure head by springing the two sides of the anchor member sufficiently to permit it to be inserted in the slot 66. At this time the machine is in the position shown in Figs. 1 and 2 of the drawings; the rods 27, 28 holding the plunger support 26 together with the mold plunger 29 in raised position, the mold plunger being substantially on a level with the top of the mold plate 30, while the mold block 35 remains in retracted position. The block may now be placed in position upon the mold plunger. If now the operator pulls the control lever 75 forward to release the safety device, and thereafter pulls the lever 67 forward to operate the throttle valve to admit steam to the rear of the piston 48, the actuating means will tend to bring the toggle into alinement, thereby causing the pressure head to descend. With the descent of the pressure head the plunger support will descend also, carrying with it the mold plunger 29 until said plunger support 26 seats upon the brackets 24 and 25. During the descent of the pressure head the wedge 40 will be forced between the movable mold block 35 and the stationary mold plate 30 thereby inwardly moving the side walls 33 and 34 of the mold. The continued descent of the pressure head will cause the anchor member 65 to be forced into the block 64. Slightly prior to the application of pressure to the block by the pressure head 19, the side walls 33 and 34 of the mold will be moved inwardly by the wedge 40 far enough to contact with the sides of the block and preferably to exert a considerable pressure against the sides of the block. This pressure need not necessarily be sufficient to compress the material of the block but should be sufficient to hold the block from spreading when the full downward pressure is applied thereto by the toggles. With the construction and arrangement here shown a very considerable pressure may be exerted against the sides of the block. The parts are so arranged that preferably this pressure is applied when the lower mold plunger 29 is in pressure-receiving position, that is when the mold plunger support seats upon the brackets 24 and 25. Thereafter as the toggles come more nearly into alinement, sufficient pressure will be exerted upon the block between the pressure head 19 and the mold plunger 29 to force the anchor member into and thoroughly embed it in the block while the pressure upon the sides of the block is being maintained.

The pressure upon the block may be continued for a longer or shorter time as may be desired to thoroughly embed the anchor member in the block or to thoroughly compact the material of which the block is made. When it is desired to raise the pressure head the lever 67 is moved back through the neutral position until the throttle valve cuts off the steam supply from the rear of the piston 48, opens the same to exhaust and admits steam to the front of the piston 48, thus causing the toggles to be drawn back out of alinement and raising the pressure head.

The raising of the pressure head ends the downward pressure upon the block and thereafter permits the side walls 33 and 34 of the mold to be withdrawn from contact with the block by the action of the springs 38, 39. Upon further lifting of the pressure head, the rods 27, 28 (see Fig. 3) will engage the plunger support 26 and raise the mold plunger 29 in the mold until it is substantially on a level with the top of the mold plate 30, thus lifting and ejecting the block vertically from the mold, leaving it however, in place upon the elevated plunger in position for ready removal from the press by hand or otherwise.

The safety device will now return to its normal position and prevent the descent of the pressure head until both control levers are again operated.

The operation of the steam cylinder with the cushioning devices having been previously described, its operation in connection with the manufacture of anchor blocks or in connection with repressing blocks will be sufficiently obvious.

It is to be understood that the invention may be variously modified and embodied within the scope of the subjoined claims.

Claims:

1. The improvement in the art of making anchor paving blocks which comprises affixing an anchor member thereto while the block is in semi-plastic condition and simultaneously applying pressure to the sides of the block.

2. The improvement in the art of making anchor paving blocks which comprises embedding the anchor member in said block while in a semi-plastic condition, simultaneously applying pressure to the sides of a block and thereafter applying pressure to the top and bottom of the block to thoroughly compact the material thereof.

3. The method of uniting an asphalt paving block with a bed anchor which comprises pressing the bed anchor into that surface of the block which is to be the bottom surface in use, such pressing being effected after the block has been compressed in a heated condition, but prior to complete cooling and hardening thereof.

4. The improvement in the art of making anchor paving blocks which includes releasably attaching an anchor member to the under side of the pressure head of a press, placing the block in operative position relative thereto, actuating the pressure head, applying pressure to the sides of the paving block and maintaining said side pressure until the anchor member is embedded in the block.

In testimony whereof I have signed my name to this specification.

GEORGE P. HEMSTREET.